J. DOYLE.

FEED WATER PIPE.

No. 4,346. Reissued Apr. 18, 1871.

*Witnesses:*

O. E. Duffy

Chas. G. Fisher

*Inventor:*

John Doyle

THE NORRIS PETERS CO., PHOTO-LITHO., WASHINGTON, D. C.

United States Patent Office.

JOHN DOYLE, OF BALTIMORE, MARYLAND, ASSIGNOR TO HIMSELF AND ANTHONY REYBOLD, OF DELAWARE CITY, DELAWARE.

Letters Patent No. 110,753, dated January 3, 1871; reissue No. 4,346, dated April 18, 1871.

DIVISION B.

IMPROVEMENT IN FEED-WATER PIPES.

The Schedule referred to in these Letters Patent and making part of the same.

I, JOHN DOYLE, of Baltimore, in the county of Baltimore and State of Maryland, have invented an Improvement in Feed-water Apparatus, of which the following is a specification.

The nature of my invention consists in providing a perforated feed-water pipe in the interior of a steam-boiler, with puppet-valves fitted into conical seats in the perforations.

The object of my invention is to distribute the feed-water in all parts of the boiler equally and simultaneously in annular sheets or sprays, by means of the conical form of the valves and valve-seats, in addition to relieving the feed-check valve of any pressure from within.

By the employment of puppet valves the water is distributed equally in a thin sheet all around the valves, as would not be the case with other forms of check-valve.

In the accompanying drawing—

Figure 1:
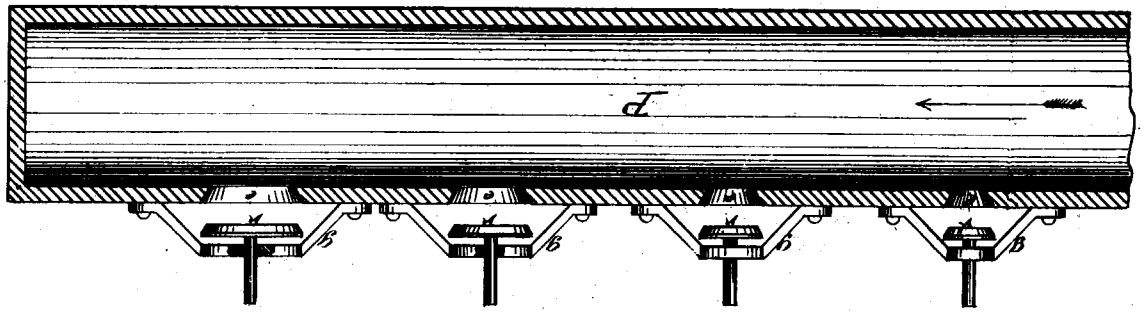
Figure 1 represents a longitudinal section.
Figure 2:
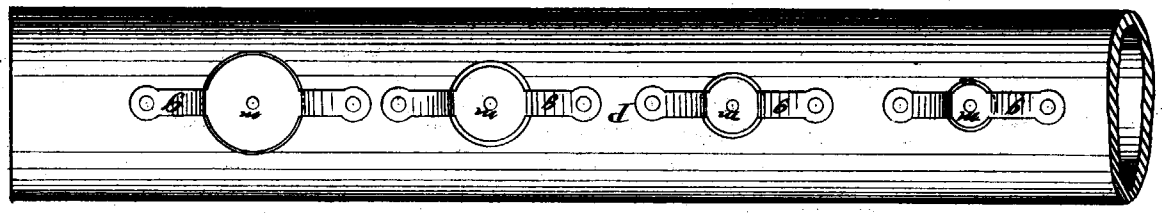
Figure 2 represents a top view.

*p p* represent the feed-pipe in the boiler;

*v v* represent the check-valves, and

*s s* their seats.

*g g*, the guards, in which the valve-stems work.

*m m* is the valve-stem.

Each of the perforations *e e*, which are made in the pipe at suitable distances, is provided with a puppet-valve with a conical seat.

The feed-water passes through the feed check-valve into the feed-pipe *p p* and out of the perforations *e e*, and is separated by the conical form of the valves and valve-seats, and distributed throughout the water-space of the boiler in an annular sheet or spray.

These puppets are opened by means of the pressure from the feed check-valve, and when the feed-supply is cut off the valves return to their respective seats, closing themselves, and resist any pressure external to the pipe *p p*, thus relieving the feed-check valve of any strain by a retrograde pressure of the feed-water.

I do not claim, broadly, check-valves within steam-boilers; but

What I do claim is—

A puppet-valve or series of puppet-valves within a steam-boiler, on a pipe discharging water thereinto, substantially as and for the purpose hereinbefore described.

In testimony whereof I have signed my name to this specification in the presence of two subscribing witnesses.

JOHN DOYLE.

Witnesses:

CHAS. G. FISHER,

T. C. BRECHT.